United States Patent
Kavalar

(10) Patent No.: US 12,530,508 B1
(45) Date of Patent: Jan. 20, 2026

(54) SYNTHETIC GENERATION OF SIMULATION SCENARIOS AND PROBABILITY-BASED SIMULATION EVALUATION

(71) Applicant: Zoox, Inc., Foster City, CA (US)

(72) Inventor: Andraz Kavalar, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 1182 days.

(21) Appl. No.: 17/459,214

(22) Filed: Aug. 27, 2021

(51) Int. Cl.
*G06F 7/48* (2006.01)
*G06F 30/20* (2020.01)

(52) U.S. Cl.
CPC .................................. *G06F 30/20* (2020.01)

(58) Field of Classification Search
CPC ....................................................... G06F 30/20
See application file for complete search history.

(56) References Cited

U.S. PATENT DOCUMENTS

| | | | | |
|---|---|---|---|---|
| 2006/0064295 A1* | 3/2006 | Schwaiger | ............... | G06N 7/01 703/22 |
| 2009/0234552 A1* | 9/2009 | Takeda | ................... | G08G 1/167 701/1 |
| 2013/0035822 A1* | 2/2013 | Singh | .................. | G07C 5/0841 701/29.9 |
| 2018/0141544 A1* | 5/2018 | Xiao | .................. | G01C 21/3469 |
| 2022/0153309 A1* | 5/2022 | Cui | ........................ | G06N 3/088 |

* cited by examiner

*Primary Examiner* — Nithya J. Moll
(74) *Attorney, Agent, or Firm* — Lee & Hayes, P.C.

(57) ABSTRACT

Techniques are discussed herein for generating and evaluating driving simulations based on synthetic scenarios. Simulated objects may be controlled based on parameters determining the attributes and behaviors of the objects, and scenarios may be synthetically modified by changing the parameters for a simulated object. For a driving scenario with a synthetic simulated object, a simulation system may analyze driving log data to determine a probability or prevalence associated with the driving scenario. In various examples, the simulation system may determine marginal density estimates for individual attributes of the simulated object, as well as a cumulative distribution function modeling the dependence between the attributes. The joint probability distribution determined for the synthetic simulated object can be used for evaluating the efficacy of the simulation and the performance of the simulated vehicle controllers.

20 Claims, 9 Drawing Sheets

SYNTHETIC GENERATION OF SIMULATION SCENARIOS AND PROBABILITY-BASED SIMULATION EVALUATION

BACKGROUND

Vehicles are increasingly supplementing or replacing manual functionality with automatic controls. Autonomous driving may benefit from computing systems capable of making split-second decisions to respond to myriad events and scenarios, including vehicle reactions to dynamic objects operating in an environment of the vehicle. Simulations can be used to test and validate the features and functionalities of vehicle control systems, including those that may be otherwise prohibitive to test in real world environments, due to safety concerns, limitations on time, repeatability, etc. For example, autonomous vehicles may use driving simulations to test and improve the performance of the vehicle control systems with respect to passenger safety, vehicle decision-making, sensor data analysis, route optimization, and the like. However, driving simulations that accurately reflect real world scenarios may be difficult and expensive to create and execute, as the data used to create such simulations may be noisy, inconsistent, or incomplete. Additionally, execution of driving simulations may involve executing multiple different interacting systems and components, including the vehicle control systems being evaluated, as well as agents and other objects in the simulated environment, which may be resource and computationally expensive.

Driving scenarios used to execute simulations may include a simulated environment and a number of simulated static and dynamic objects. During a driving simulation, one or more vehicle control systems interacts with the simulated environment and simulated objects of the driving scenario. Such scenarios can be generated programmatically as original scenarios and/or can be based on driving log data captured by vehicles operating in an environment. When driving log data is captured, it may include object data representing the actions or reactions of agents or other dynamic objects (e.g., other vehicles, bicycles, pedestrians, animals, etc.) in a given driving scenario. However, the behavior of agents and other objects may be scenario dependent, and observed object movements in a log-based scenario might be insufficient or incomplete for evaluating vehicle control systems during simulations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
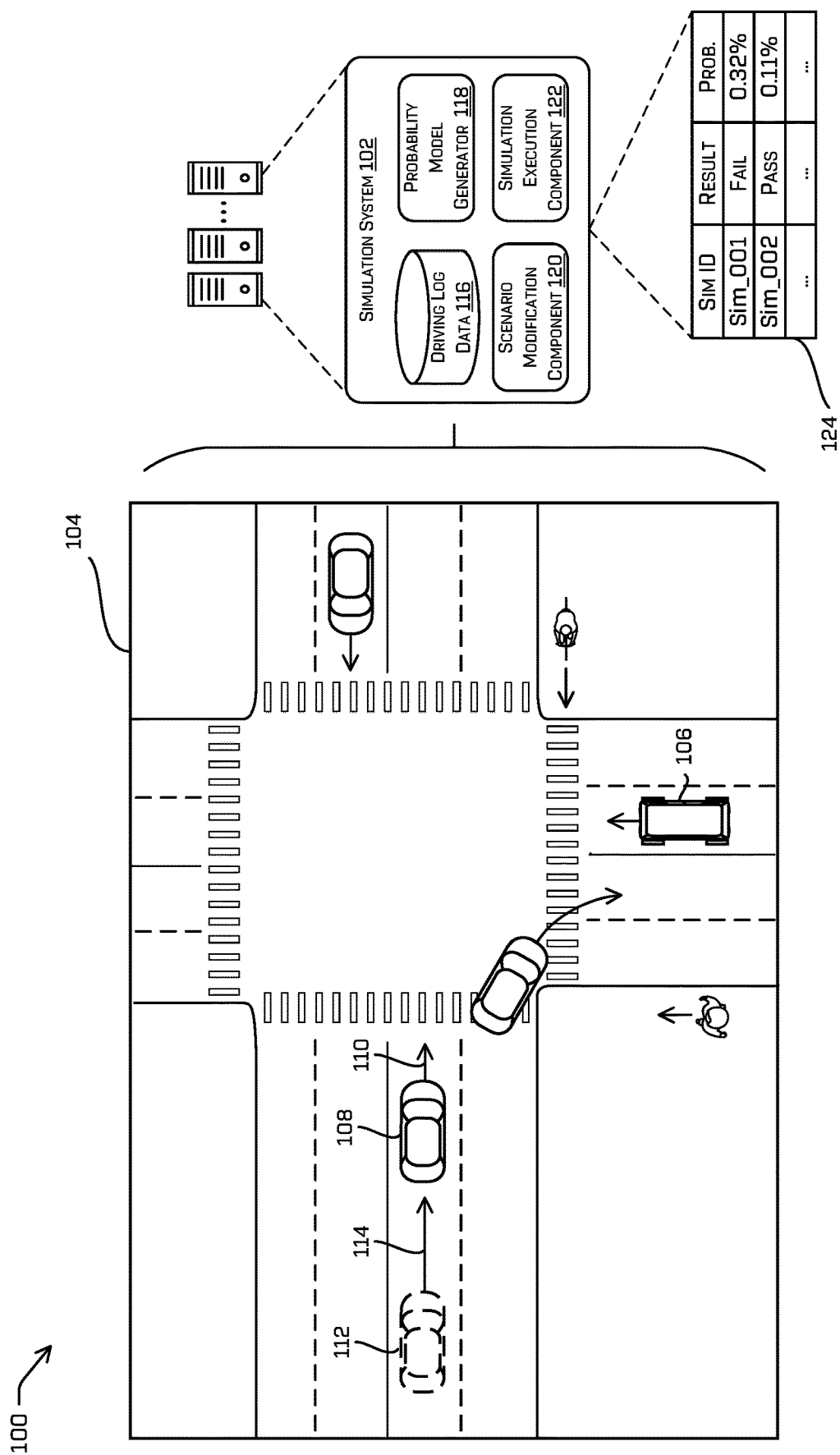
FIG. 1 illustrates techniques for executing and evaluating driving simulation results and probabilities associated with a synthetic scenario, in accordance with one or more implementations of the disclosure.

This application relates to generating and evaluating driving simulations based on synthetic and/or modified driving scenarios. In various examples, a synthetic or log-based driving scenario may be modified using operational parameters that control the attributes and behaviors of one or more simulated objects within the driving scenario. The result of the modification is a driving scenario that may be wholly or partially synthetic, and may be used to generate and perform driving simulations to evaluate the performance of vehicle control systems. In some examples, a simulation system may determine a probability associated with a modified and/or synthetic driving scenario, the probability indicating a likelihood or prevalence of encountering a similar scenario within a real-world driving environment. As described herein in more detail, the simulation system may determine separate marginal density estimates associated with different attributes of a simulated object. Additionally, the simulation system may determine a multi-variate cumulative distribution function, such as a copula, modeling the dependence between the attributes. The simulation system also may determine a joint probability distribution based on the marginal density estimates and the copula, which may be used to model the probability associated with the modified synthetic driving scenario, and the corresponding efficacy of driving simulations executed based on the scenario.

As noted above, driving simulations can be used to test and validate the features and functionalities of vehicle control systems, in order to improve passenger safety, vehicle decision-making, sensor data analysis, route optimization, and the like. In general, performing large numbers of driving simulations based on many different and diverse driving scenarios can provide the most effective testing and validation of the vehicle control systems. Different driving scenarios may include different types of driving environments (e.g., city driving scenarios, highway driving scenarios, 2-way or four way stop intersection scenarios, parking lot scenarios, etc.), as well as different configurations of static and dynamic objects in the simulated environment.

For instance, a particular driving scenario may include a number of different static objects (e.g., buildings, bridges, signs, etc.) and/or dynamic objects (e.g., cars, trucks, trains, pedestrians, bicyclists, etc.), with which the vehicle control systems may interact with and respond to during the simulation.

In various examples, a simulation system may generate and execute (e.g., run) driving simulations including log-based simulations based on driving scenarios captured from log data, and/or synthetic simulations based on synthetic driving scenarios. In some cases, a simulation system may generate log-based simulations based on the driving log data corresponding to a particular driving scenario. For instance, the simulation system may generate simulations utilizing techniques such as those described in U.S. patent application Ser. No. 16/376,842, filed Apr. 5, 2019 and entitled "Simulating Autonomous Driving Using Map Data and Driving Data," U.S. patent application Ser. No. 16/555,988, filed Aug. 29, 2019 and entitled "Vehicle Controller Simulations," U.S. patent application Ser. No. 17/184,128, filed Feb. 24, 2021 and entitled "Agent Conversions in Driving Simulations," U.S. patent application Ser. No. 17/184,169, filed Feb. 24, 2021 and entitled "Simulating Agents based on Driving Log Data," the entire contents of which are incorporated herein by reference for all purposes. In examples using log-based driving simulations, the scenarios upon which driving simulations are generated may be based on driving log data captured in actual physical environments.

In other examples, driving simulations may be generated based on synthetic driving scenarios. In some instance, a synthetic driving scenario may be created, ab initio, programmatically, and need not be based on any driving log data associated with physical environments. In other instances, a synthetic driving scenarios may be generated by adding, removing, and/or modifying various static or dynamic objects from a log-based driving scenario. For driving simulations based on either synthetic or log-based driving scenarios, the simulation may be associated with an entire driving scenario or a portion of a scenario. For instance, a portion of the scenario may represent a period of time (e.g., 20 seconds, 30 seconds, 45 seconds, etc.) that is less than a total time associated with the entire log-based or synthetic scenario. For example, a simulation may include a 30 second period of time (e.g., snippet) of a 40-minute log associated with a vehicle operating in a physical environment, though this is just an example and other periods of time associated with the simulation and/or log are contemplated herein.

To generate a driving simulation, based on either a synthetic or log-based driving scenario, the simulation system may determine and programmatically simulate the stimulation environment and the various static and/or dynamic objects (e.g., agents) in the simulated environment defined by the driving scenario. To programmatically generate and control the various simulated objects, the simulation system may use operational parameters to define the various different attributes and/or behaviors of each simulated objects. For example, the simulation system may include object controllers configured to control the attributes and behaviors of "smart objects" (e.g., non-playback simulated agents that operate autonomously or semi-autonomously). To control a simulated smart object during a simulation, simulation system may initiate an object controller and determine a set of operational parameters that the object controller can use to control the state and/or behaviors of the simulated object. For instance, the operational parameters used to control a simulated object during a simulation may include various parameters that define the starting location, pose, trajectory, velocity, and/or acceleration of the simulated object at the beginning of the simulation. Additionally or alternatively, the operational parameters may include data values and/or settings that can be used by the object controller(s) to determine navigation decisions, movements, and/or other behaviors for a simulated object while traversing a simulated environment during the simulation. For instance, the parameters for a simulated object may determine the velocities at which the simulated object moves during a simulation, its acceleration and/or deceleration rates, its following distances, its lateral acceleration rates during turning, its stopping locations relative to stop signs and crosswalks, etc. The parameters also may determine the navigation decisions that a simulated object may perform during a simulation, including but not limited to how the simulated agent performs route planning, whether or not the simulated agent will use bike lanes when determining a route, whether the simulated agent will use lane splitting and/or lane sharing, the desired cruising speed of the simulated agent relative to the speed limit (e.g., based on object type), the maximum possible speed and acceleration of the simulated agent (e.g., based on object type), the desired distances of the simulated agent from other objects/agents in the simulated environment (e.g., based on object type), how the simulated agent will respond to traffic lights, stop signs, yield signs, stop lines, school zones, construction zones, when the simulated agent uses turn signals, turns on/off lights, and/or engages other vehicle controls, how the simulated agent reacts to potential interactions with other simulated objects, and so on.

Synthetic simulations, based on wholly or partially synthetic scenarios, may provide advantages over log-based simulations in some cases. For instance, log-based simulations may be based on real-world driving log data captured by the sensors of a vehicle traversing a physical environment, and thus the simulated environment and objects in the log-based simulations may be constrained to appear and behave in the same manner in the captured log data. As a result, log-based simulations may be limited and incomplete with respect to the driving scenarios they can provide, and the features and functionalities that they can test and validate. Synthetic simulations, in contrast, can be programmed to simulate any possible driving scenario and to include any possible number and/or configuration of static and dynamic objects within the simulated environment. As a result, synthetic scenarios can provide more robust simulation testing and validation, by exposing the vehicle control systems in the simulate to many more possible combinations of simulated environments and configurations of objects, as well as various different combinations of object attributes and/or behaviors. For instance, a log-based driving scenario may be unable to represent a particular type of simulated object, or a simulated object attribute/behavior that has not been previously observed and collected as driving log data. Thus, log-based driving scenarios having only playback objects and agents might not include any simulated objects having relatively infrequent or outlier attributes and/or behaviors, such as objects moving unusually fast or slow, objects in usual poses or positions, objects following usual trajectories, and the like. However, synthetic simulations based on wholly or partially synthetic driving scenarios can readily include rarely (or never) observed environments, objects, and/or object behaviors/attributes, by programmatically generating these uncommon simulation objects or other simulation features.

For these reasons, synthetic simulations may provide more complete and robust test coverage of the vehicle control systems, by programmatically simulating infrequent or uncommon environmental features, combinations of object behaviors and attributes, etc., that rarely or never appear within the driving log data captured in real-world environments. However, evaluating the vehicle control systems as a whole may include evaluating not only the performance of the vehicle control systems during the driving simulations, but only evaluating the probability of similar simulation conditions occurring during a real-world driving scenario. For instance, if a vehicle controller fails to respond properly during a synthetic simulation that has an extremely small chance of occurring during the lifetime of the vehicle, then the simulation failure may be relatively unimportant. In contrast, if a vehicle controller fails a synthetic simulation that has a significantly larger chance of occurring during the lifetime of the vehicle operating in the real-world, then the simulation failure may be relatively important. Therefore, although synthetic simulations provide a valuable tool for exposing vehicle control systems to previously unobserved and/or uncommon driving scenarios, they present the additional challenge of evaluating the probability of occurrence associated with the simulation. The probability of occurrence may represent a probability of encountering a real-world driving scenario that corresponds to a synthetic simulation, and also may correspond to a prevalence rate of the synthetic simulation in terms of driving time and/or mileage. Synthetic simulations having a greater probability of occurrence may provide greater efficacy for testing and validating the vehicle control systems, and may be more valuable in calculating vehicle safety and other vehicle performance metrics.

To address the challenges associated with evaluating simulations based on synthetic scenarios, various techniques described herein relate to determining probabilities associated with synthetic driving scenarios for which real-world driving log data may be incomplete or unavailable. As noted above, a probability of a synthetic scenario may correspond to a likelihood or prevalence encountering a similar or identical scenario real-world driving environment. Such probabilities may be determined in terms of driving time and/or driving miles, and also may be associated with particular driving regions (e.g., particular countries, cities, states, counties, etc.), particular types of driving locations (e.g., rural, suburb, or city driving, highway driving, intersection with pedestrians, parking lot, school zone, construction zone, curved roads, hills, four-way stops, two-way stops, and the like etc.), and/or particular types of driving conditions (e.g., night driving, low-visibility driving, driving in rain or snow, etc.).

As described below in more detail, to determine a probability associated with a synthetic simulation scenario, a simulation system initially may determine individual marginal density estimates for one or more attributes associated with a simulated object. An attribute may include any of the object attributes described herein, including attributes associated with a starting state of an object at the beginning of a simulation time window, or attributes associated with the behavior of an object during a simulation. For instance, an attribute associated with an object starting state may include an object type, object size, starting location, starting pose, starting trajectory, starting velocity, and/or starting acceleration of the object at the beginning of the simulation time window. Attributes associated with the behavior of the object during a simulation may include object navigation decisions, object movements, velocities, acceleration/deceleration rates, following distances, stopping locations relative to other objects (e.g., vehicles, signs, street markings, crosswalks, curbs, etc.). Additional attributes may relate to navigation decisions of the simulated object during a simulation, such as how the simulated agent performs route planning, whether or not the simulated agent will use bike lanes when determining a route, whether the simulated agent will use lane splitting and/or lane sharing, the desired cruising speed of the simulated agent relative to the speed limit (e.g., based on object type), the maximum possible speed and acceleration of the simulated agent (e.g., based on object type), the desired distances of the simulated agent from other objects/agents in the simulated environment (e.g., based on object type), how the simulated agent will respond to traffic lights, stop signs, yield signs, stop lines, school zones, construction zones, when the simulated agent uses turn signals, turns on/off lights, and/or engages other vehicle controls, how the simulated agent reacts to potential interactions with other simulated objects, and so on.

To determine a marginal density estimate associated with an attribute, the simulation system may receive log data captured by vehicles operating in physical environments, and may analyze the log data determine a set of observed values for attribute. In some examples, the simulation system may use Bayesian density estimation techniques to infer a distribution of the attribute values. For instance, the simulation system may determine values for individual bins of data (e.g., histograms) corresponding to different ranges of attribute values, and may perform a Poisson regression on the individual bins to determine the density estimation for the attribute.

When Bayesian techniques are used, the density estimations may be represented as a continuous distribution in some cases, and may include attribute values having a non-zero estimated density even when the driving log data upon which the Bayesian density estimation is based does not include any observations of those attributes values. Examples of such cases may include gaps within the observed data for the attribute values and/or the tails of the distribution (e.g., outliers) beyond the individual data bins in which no observations were captures. In these cases, the Bayesian density estimation may infer a data distribution that includes non-zero estimated of an attribute value even in the absence of any observations of that precise attribute value.

In various examples, the simulation system may use different statistical techniques to determine marginal density estimations for object attributes, based on the observations of the attribute within the driving log data. Such techniques may include Bayesian methodologies and/or frequentist methodologies; however, in certain examples Bayesian methodologies may provide additional technical advantages. For instance, as described above Bayesian techniques for density estimation may provide non-zero estimations for attribute values within gaps or beyond the ranges of attribute values observed from the driving log data.

Additionally, when Bayesian density estimation techniques are used, the same Bayesian techniques may be used to marginal density estimations may include one or more confidence intervals for each point of the distribution. As can be understood from the context of this disclosure, when Bayesian techniques are used to determine confidence intervals, the size of the resulting confidence intervals may be based on the amount of data within the driving log data. The portions of the Bayesian density estimation distribution having relatively fewer observed data points may have larger (e.g., further separated) confidence intervals, while the portions of the Bayesian density estimation distribution having greater numbers of observations may have smaller (e.g., closer together) confidence intervals.

In some examples, when a marginal density estimation for an attribute results in a relatively jagged distribution (e.g., greater than a threshold number and/or steepness of peaks and valleys within the distribution), then the simulation system may perform one or more smoothing techniques on the marginal density estimation distribution. In some instances, the simulation system may perform a non-parametric smoothing of a marginal density estimation using a kernel smoother. In such instances, the simulation system may determine a kernel width (also referred to as a kernel bandwidth), based on the characteristics of the marginal density estimation (e.g., the Bayesian density estimation function). The simulation system may configure a kernel smoother based on kernel width, and then apply the kernel smoother to transform each portion of the marginal density estimation distribution based on the surrounding portions.

Each marginal density estimate may be generated based on data associated with a particular object attribute (e.g., staring location, velocity, acceleration, trajectory, pose, following distance, etc.). When multiple different marginal density estimates are determined for multiple attributes, the simulation system may determine a cumulative distribution function (e.g., a copula) to model the dependence between the attributes. For instance, in a driving scenario including a 4-way intersection, the velocity at which a vehicle travels may be dependent on the distance of the vehicle from the intersection (and vice versa). As others example, the following distance of a vehicle in a highway driving scenario or city driving scenario may be related to the vehicle acceleration/deceleration patterns of the vehicle (and vice versa), and the size of certain objects such as pedestrians or trucks may be related to their velocities and/or accelerations (and vice versa). Although only a few examples of attribute dependencies are described herein, it can be understood from the context of this disclosure that any combination of two or more attributes may have dependency relations for a particular simulated object.

In some examples, the simulation system may determine a copula to model the dependencies between two or more attributes. As used herein, copulas may refer to multi-variate cumulative distribution functions that can model the dependence relationships between two or more marginal distributions. As described below in more detail, a copula may be determined by transforming and then mapping the individual marginal density estimations into a uniform space (e.g., a [0, 1] interval), to model the dependence structure between the individual marginal density estimations. A copula may be represented as a graphical model and/or as a cumulative distribution function. The simulation system may determine (or select) the copula based on the individual marginal density estimates for the attributes. The use of copulas may allow the simulation system to model the relationships between object attributes at any level of complexity. In various examples, the simulation system may use any various type of copula to model the dependence relationships between attributes, including but not limited to a Gaussian copula or any of the types of Archimedean copulas. The combination of the marginal density estimations and a copula (or other cumulative distribution function) may determine the joint probability distribution for the combination of attributions.

Therefore, using the techniques described herein, the simulation system may break down the problem of determining a joint density estimation for a combination of attributes into the separate tasks of determining separate marginal density estimations for the attributes on a [0, 1] interval, and generating the copula as a dependence model (e.g., dependence structure or cumulative distribution function) on the individual attributes. Similar techniques may be used by the simulation system to model even very complicated joint distributions.

Thus, the techniques discussed herein may improve the functioning of a simulation computing system (e.g., simulation system) in many ways. In addition to modeling complex joint distributions, the techniques described herein may determine improved (e.g., more realistic) probabilities of synthetic driving scenarios based on real-world driving log data evaluating, and improved evaluations of the efficacy of driving simulations based on the synthetic scenarios. For instance, by using Bayesian techniques to determine the marginal density estimations for the attributes, the simulation system can determine improved probabilities for attribute values, including determining non-zero probability predictions even when no observations of the attribute values are present within the driving log data. The simulation system also may use the joint distributions resulting from these techniques to determine the improved probabilities associated with synthetic scenarios, including partially synthetic scenarios generated by modifying object(s) from a log-based driving scenarios, and wholly synthetic scenarios generated programmatically and not from log-based driving scenarios.

By determining improved probabilities associated with synthetic driving scenarios, the simulation system also may perform improved determinations of the efficacy of simulations based on the synthetic scenarios. The evaluation of vehicle control systems can thus be improved by scoring and/or weighting driving simulations, based not only on the results of the simulation but also on the probability and degree of realism associated with the simulation scenario. The simulation system may withdraw from consideration or down-weight results of simulations for which the simulation scenario does not meet a threshold probability. As such, the simulation system may focus on simulations with greater real-world applicability and may reduce the total number of simulations required for sufficiently evaluating vehicle control systems in some examples. Accordingly, the simulation computing system may be configured to reduce an amount of computing resource overhead and data required to perform simulations, while improving the accuracy of the simulation-based analysis of vehicle control systems, thereby improving the performance of the simulation computing system in evaluating synthetic scenarios and determining the efficacy of simulation batteries. As such, the techniques described herein also may improve the safety performance of autonomous vehicles.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 illustrates a diagram 100 depicting certain techniques for executing and evaluating driving simulation results and probabilities associated with a synthetic driving scenario. In various implementations, some or all of the operations described in connection with diagram 100 may performed by driving simulation systems, such as the simulation system 102.

As described in more detail below, the simulation system 102 may be configured to generate and execute simulations to test and validate vehicle control systems (e.g., vehicle controllers of autonomous or semi-autonomous vehicles). A driving simulation generated by the simulation system 102 may be based on a driving scenarios, including a driving environment, a configuration of various static and dynamic objects and behaviors, and other environmental conditions. As noted above, a driving scenarios may be a log-based driving scenario corresponding to driving log data captured by the sensors of a vehicle traversing a real-world physical environment, or a synthetic scenario generated wholly or partially programmatically. The execute a driving simulation, the simulation system 102 may determine and instantiate a driving scenario, provide inputs from the driving scenario to the separate vehicle control system(s) being tested, and record and evaluate the responses of the vehicle control systems during the simulation.

In this example, the simulation system 102 is depicted generating and executing a simulation based on a synthetic driving scenario 104. In driving scenario 104, a simulated vehicle 106 is traversing the simulated environment that contains a number of other objects (e.g., agents) in the simulated environment. The data associated with the driving scenario 104 may include data identifying characteristics of the environment and/or any other objects in the proximity to the simulated vehicle 106 and/or with which the simulated vehicle may interact. In this example, the synthetic driving scenario 104 is depicted at a single point in time, at which multiple different simulated objects are in the proximity of the simulated vehicle 106, and at which the vehicle control systems operating the simulated vehicle 106 may capture multiple different observable behaviors (e.g., object locations, poses, velocities, trajectories, interactions, etc.). Although driving scenario 104 is depicted at a single point in time, it can be understood from the context of this disclosure that the simulated vehicle 106 may capture various object locations, movements, and behaviors at multiple different time intervals during the driving scenario 104 (e.g., every 0.1 seconds) during the course of the simulation. In driving scenario 104, at the time illustrated in diagram 100, the simulated vehicle 106 is driving along a northbound trajectory approaching a 4-way intersection. Although within the driving scenario 104 is a number of other dynamic objects (e.g., agents) near the simulated vehicle 106, including a simulated object vehicle 108, moving at a velocity 110 toward the same 4-way intersection from a different direction.

The driving scenario 104 may be based on a log-based driving scenario or may be an entirely synthetic driving scenario. In some examples, the driving scenario 104 may be generated by the simulation system 102, using a scenario modification component 120. The scenario modification component 120 may be configured to modify existing driving scenarios, including both log-based scenarios and/or synthetic scenarios, into modified synthetic scenarios. In some examples, the scenario modification component 120 may modify sets of operational parameters (or parameters) associated with one or more simulated objects in a driving scenario, to change the initial state, attributes, and/or behaviors of the objects. In this example, the simulation system 102 may use the scenario modification component 120 to modify the operational parameters of the simulated object vehicle 108 in driving scenario 104. As shown, the scenario modification component 120 may determine an updated starting position for the simulated vehicle 112, as well as an updated velocity 114. By modifying the operational parameters of one or more simulated objects in the driving scenario 104, the scenario modification component 120 modifies the driving scenario 104 into an updated (or modified) synthetic driving scenario 104.

The probability model generator 118 may be configured to perform various techniques described herein to determine joint density estimations (e.g., joint distributions) representing the probabilities associated with synthetic scenarios. For instance, as described above, a joint distribution may be associated with a particular synthetic simulated object vehicle 108, and may represent the probability of encountering a particular combination of attribute values, such as the starting position for the simulated vehicle 112 and the velocity 114 of the simulated vehicle 112.

To determine a joint probability distribution for a combination of simulated object parameters, the probability model generator 118 may use the various techniques described herein. For instance, the probability model generator 118 may initially determine individual marginal density estimates for one or more attributes (e.g., starting location, velocity) associated with a simulated object (e.g., simulated vehicle 112). In some cases, the probability model generator 118 may use Bayesian density estimation techniques (e.g., Poisson regression on individual data value bins) to determine a distribution of values for an individual attribute. The marginal density estimations also may include determining associated confidence intervals in some cases. Additionally or alternatively, the probability model generator 118 may perform a smoothing operation using a kernel smoother. After generating the individual marginal density estimates for the attributes, the probability model generator 118 may determine a copula (e.g., a multi-variate cumulative distribution function) to model the dependencies between the attributes, and may generate a joint probability distribution based on the copula and the individual marginal density estimates.

To perform various techniques, including generating the individual marginal density estimates, determining a copula, and generating a joint density estimate (e.g., a joint probability distribution), the probability model generator 118 may receive and use driving log data from one or more driving log data store(s) 116. In various cases, the probability model generator 118 may determine a joint probability distribution for the attributes of a simulated object, by initially retrieving a relevant set of driving log data containing values for the attributes. In some instances, the set of driving log data may be restricted to the driving log data associated with the particular object. In other instances, the driving log data may include driving log data associated with multiple objects of the same type, multiple objects within the same driving scenario, and/or multiple objects within similar types of scenarios. For instance, a joint probability distribution that may ultimately be applied to the simulated objects 108 and 112 may be based on log data representing only that vehicle from the initial driving logs, or based on driving log data associate with multiple similar vehicles, such as all cars of the same or similar type within a 4-way intersection scenario and/or within a scenario having similar speed limits, weather and road conditions, etc.

In this example, the simulation system 102 also includes a simulation execution component 122 configured to run the simulations including simulated objects that behave and operate based on the sets of operational parameters determined by the scenario modification component 120, for controlling one or more simulated objects. The simulation system 102 also may include a simulation evaluator configured to evaluate the outcomes of the simulation and determine the performance of the simulated vehicle 106 with respect to the simulation tests and objectives. Additionally, components of the simulation system 102 (e.g., the simulation execution component 122 and/or simulation evaluator) may use the joint probability distributions determined by the probability model generator 118 to determine a probability associated with the synthetic driving scenario 104 upon which the simulation is performed. Specifically, an evaluation may include determining a probability associated with the combination of object parameters (e.g., starting location of object vehicle 112 and velocity 114) used to control simulated objects during a simulation.

Based on the evaluations of the performance of the simulated vehicle 106 during the simulation, and the probability associated with the simulation scenario, the simulation system 102 may output data evaluating the efficacy of the simulation and/or the performance of the vehicle control systems controlling the simulated vehicle 106. For instance, table 124 includes output data identifying a simulation identifier, simulation result, and scenario probability metric associated with each of a battery of simulations. In various examples, the evaluations of simulation results and the associated driving scenario probability data may be aggregated over multiple simulations and/or multiple driving scenarios, to compute various vehicle safety metrics and other vehicle performance metrics.

Figure 2:
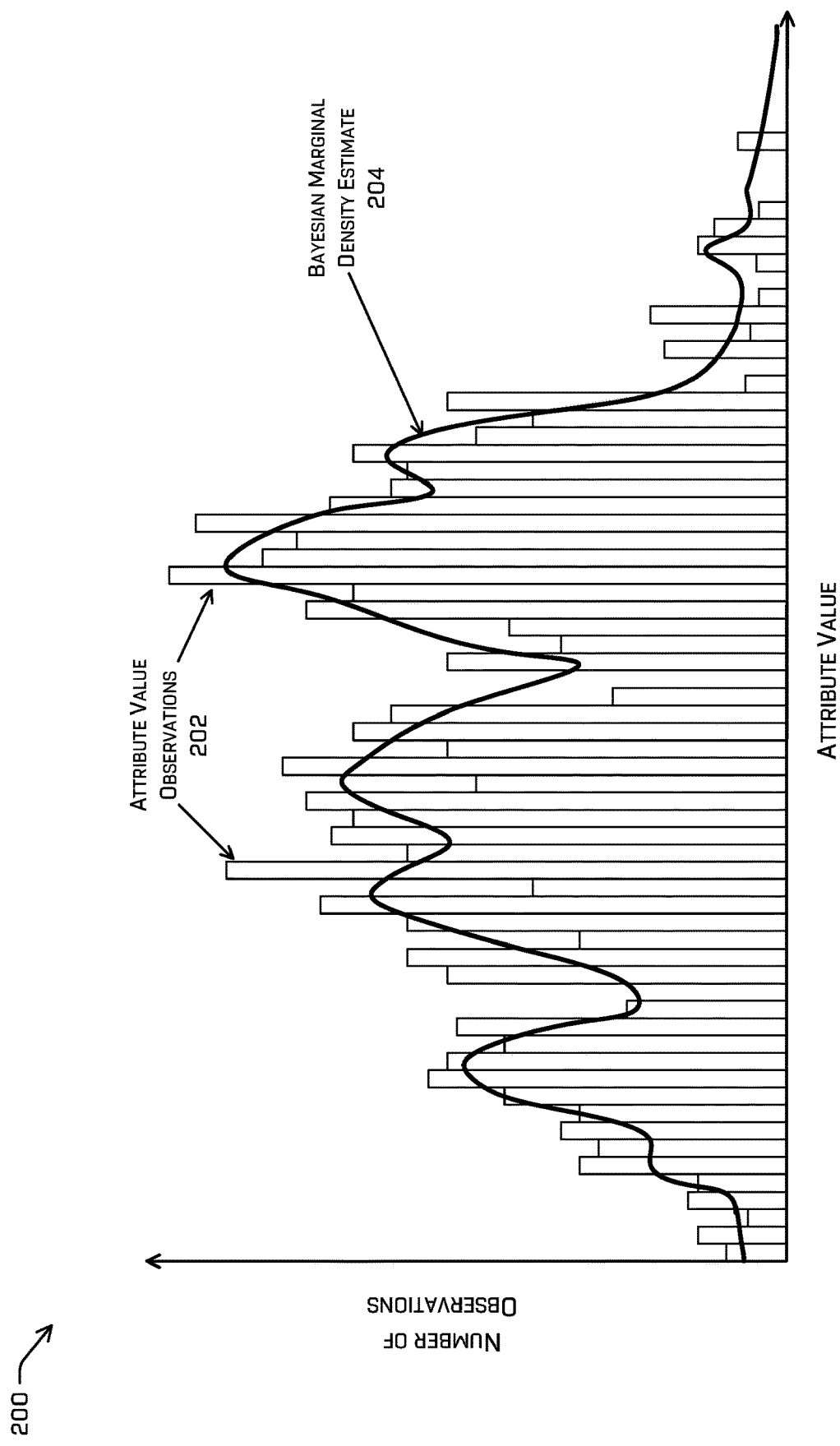
FIG. 2 depicts a graph illustrating observed object attribute values based on driving log data and an associated Bayesian marginal density estimate, in accordance with one or more implementations of the disclosure.

FIG. 2 shows a graph 200 including example data associated with an object attribute. In some examples, the data in graph 200 may be based on log data received from a driving log data store 116. The data in graph 200 may correspond to measurements of a particular attribute (e.g., position, pose, trajectory, velocity, and/or acceleration) captured for a single object or set of related objects within one or more driving logs. The attribute values may be absolute values or may be relative values (e.g., a position, velocity, pose, or following distance relative to the simulated vehicle or another object in the simulation). In some examples, the attribute value observations 202 from the driving log data may be classified and aggregated into bins corresponding to ranges of values. Binning of data based on value ranges may be used, for example, when the attribute is a continuous value (e.g., positions, velocities, accelerations, pose positions, etc.). As shown in this example, data bins may be expressed in histogram form.

Using the set of attribute value observations 202, the probability model generator 118 may perform a Bayesian density estimation technique to determine the Bayesian marginal density estimate 204 associated with the attribute. In some cases, the probability model generator 118 may perform a Poisson regression on the individual bins to determine the Bayesian marginal density estimate 204 for the attribute. As shown in this example, an advantage of using Bayesian techniques includes determining non-zero density estimates for particular attributes values having zero observations within the driving log data. For instance, the attribute value observations 202 in this example include gaps that do not include any observations, and regions outside of the range of attribute value observations 202 that also do not include any observations. Nonetheless, for these regions (e.g., gaps and portions outside of the observed range) within the attribute value observations 202, the Bayesian marginal density estimate 204 shows non-zero predictions.

Figure 3:
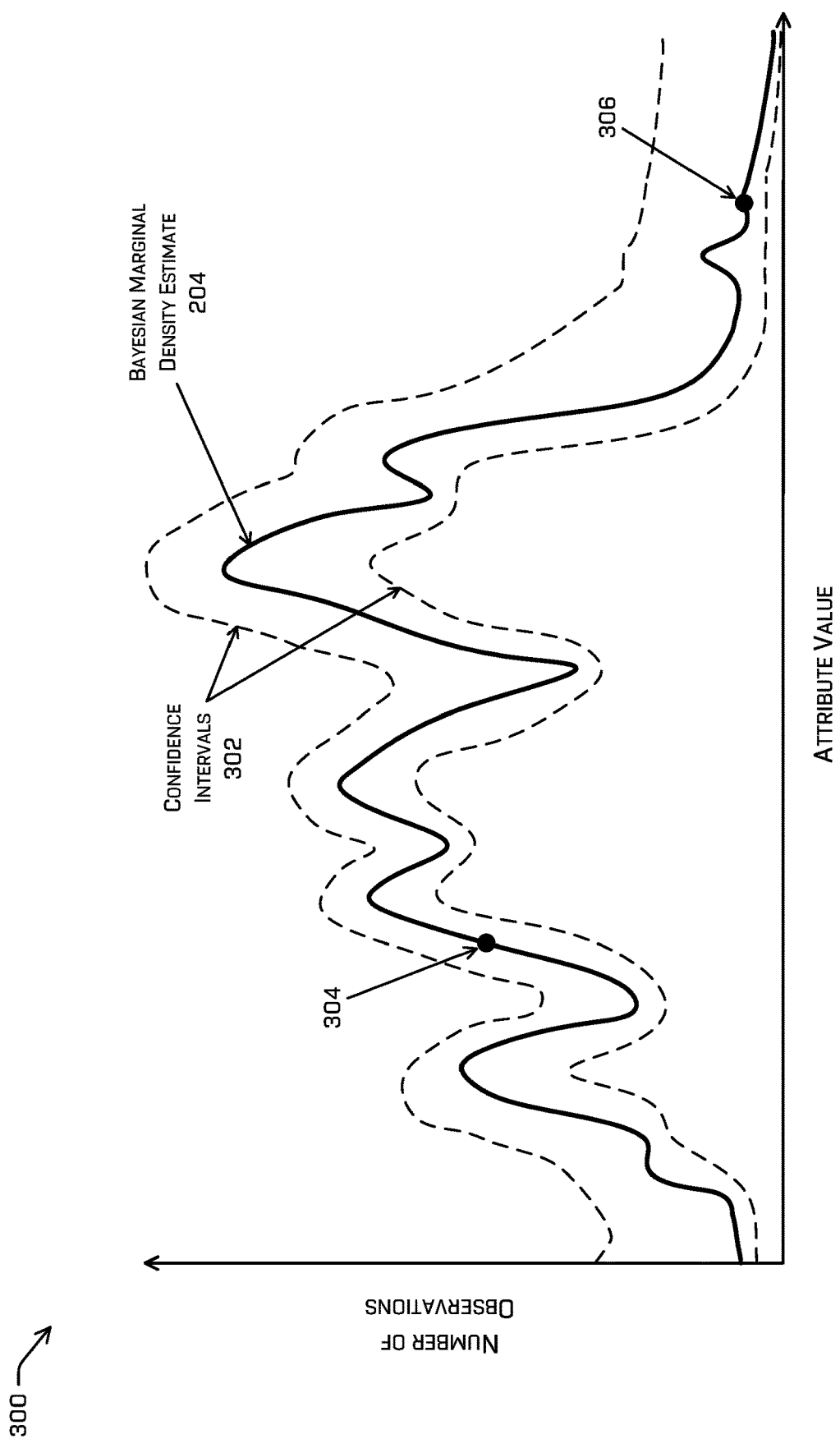
FIG. 3 depicts a graph illustrating an example Bayesian marginal density estimate and associated confidence intervals based on driving log data, in accordance with one or more implementations of the disclosure.

FIG. 3 shows another graph 300, which may build off of the example graph 200 described above. In this example, graph 300 includes a marginal density estimate associated with an object attribute, which may be the same Bayesian marginal density estimate 204 described above. Additionally, graph 300 includes confidence intervals 302 associated with the Bayesian marginal density estimate 204. As discussed above, when Bayesian techniques are used to determine marginal density estimate, similar or identical Bayesian techniques may be used to generate confidence intervals at the desired confidence level (e.g., 80%, 90%, 95%, etc.). As can be understood, in some examples the size of the confidence intervals at a particular point in the Bayesian marginal density estimate 204 may be based on the amount of data observations within the driving log data. By way of example, if the attribute value in graph 300 represents the velocity of an object (e.g., a car), and point 304 represents a velocity of 10 meters/sec, then based on a relatively large number of velocity observations near point 304, then the confidence intervals 302 at point 304 may be 90% confidence intervals of velocity values 9.6 meters/sec and 10.8 meters/sec. In contrast, point 306, which may represent a vehicle velocity of 30 meters/sec, may have relatively fewer velocity observations near that point, and the 90% confidence intervals associated with point 306 may correspond to 21 meters/sec and 44 meters/sec.

Figure 4:
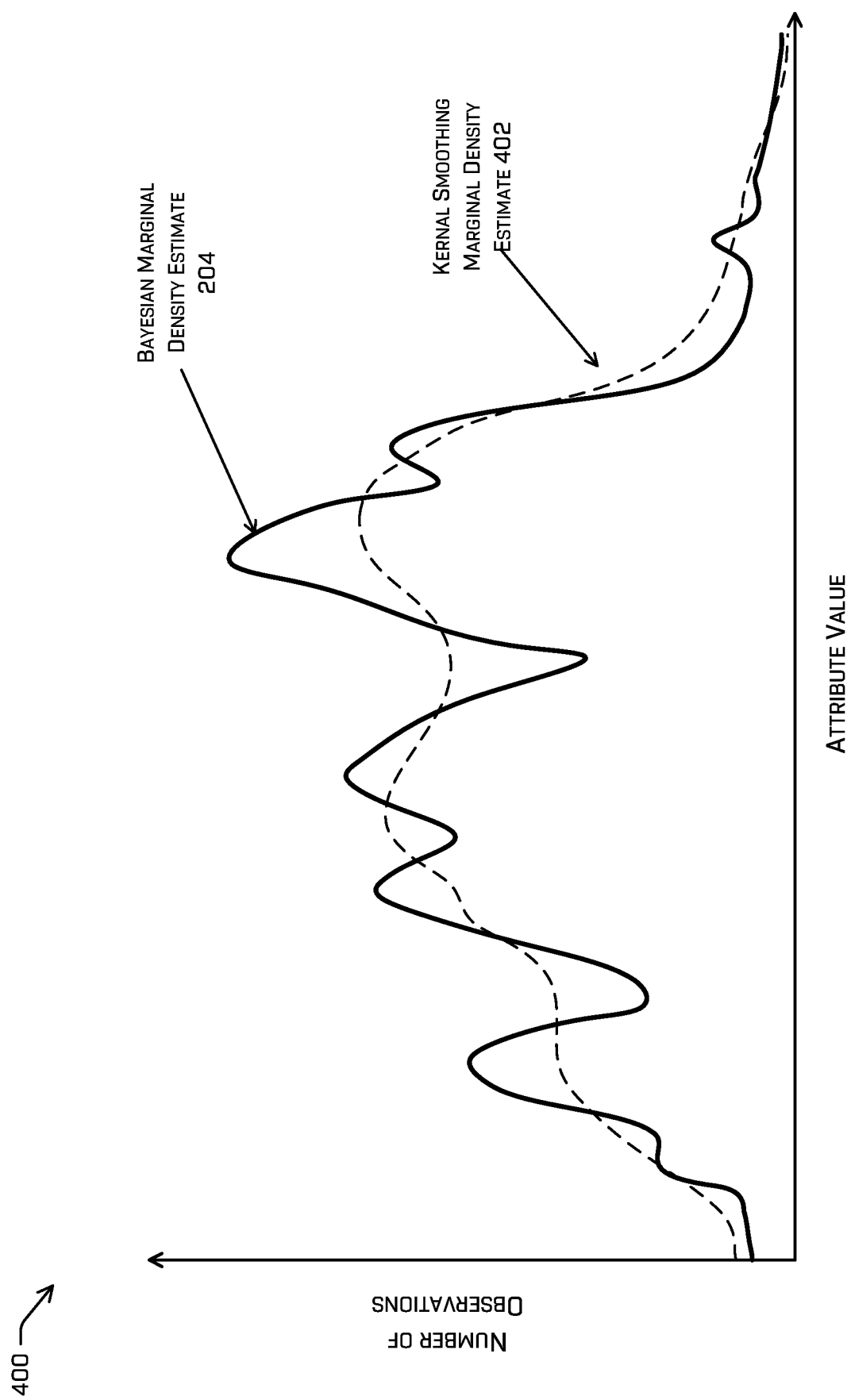
FIG. 4 depicts a graph illustrating an example Bayesian marginal density estimate and a modified density estimate based on an output of a non-parametric kernel smoothing technique, in accordance with one or more implementations of the disclosure.

FIG. 4 shows another graph 400, which may build off of the example graph 200 described above. In this example, graph 400 incudes a marginal density estimate associated with an object attribute, which may be the same Bayesian marginal density estimate 204 described above. Additionally, graph 400 includes a modified marginal density estimate for the attribute, which may correspond to a kernel smoothing marginal density 402. In some examples, the kernel smoothing marginal density 402 may be the output of a non-parametric smoothing operation performed by the probability model generator 118 using a kernel smoother. To determine the kernel smoothing marginal density 402, the probability model generator 118 may select a kernel width based on the characteristics of the Bayesian marginal density estimate 204, and then execute a kernel smoother using the determined on kernel width, to transform the Bayesian marginal density estimate 204 into the kernel smoothing marginal density 402.

Figure 5:
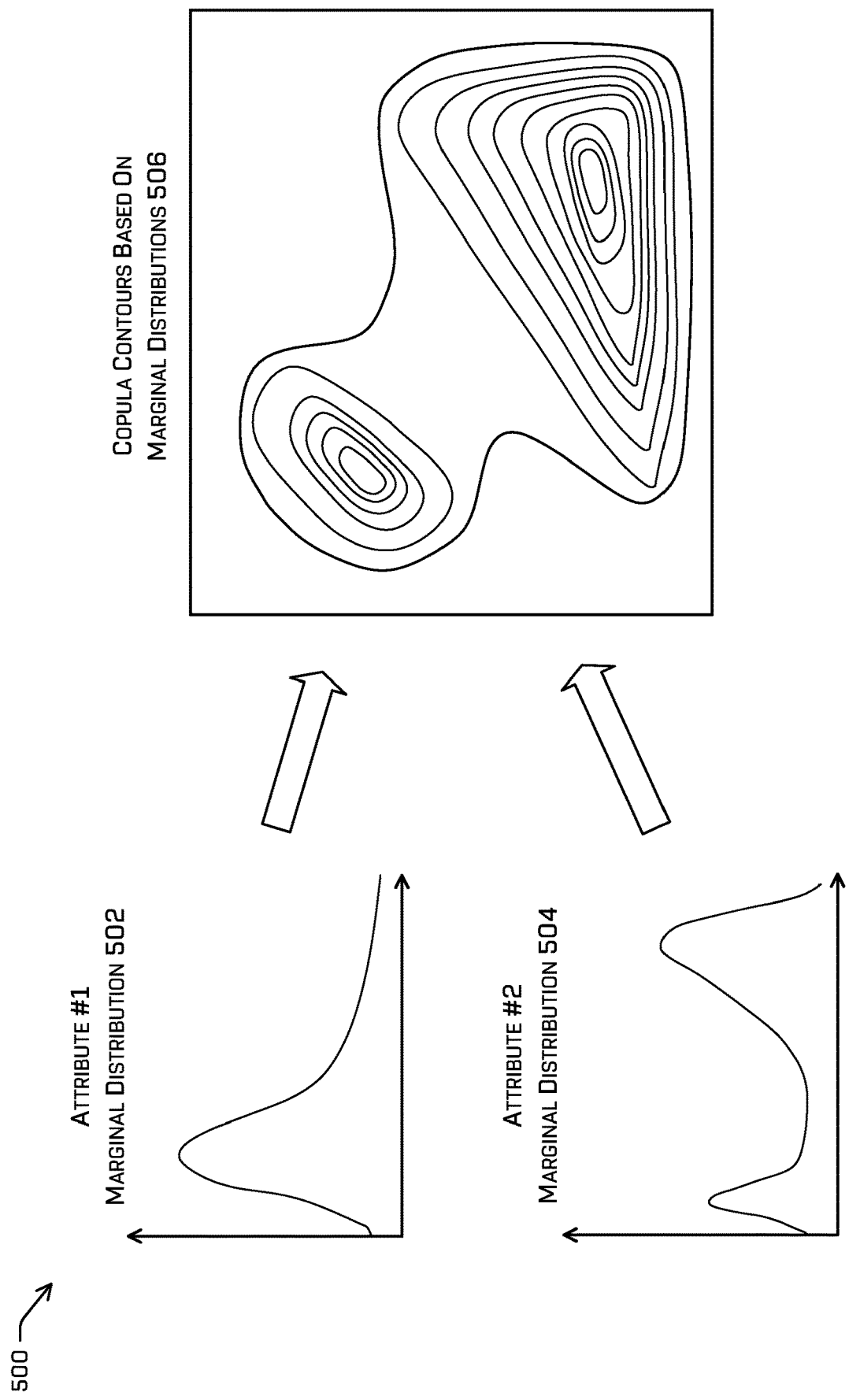
FIG. 5 depicts a graph illustrating two example marginal density estimates for separate object attributes, and an associated cumulative distribution function modeling the dependence between the attributes, in accordance with one or more implementations of the disclosure.

FIG. 5 depicts a diagram showing two different marginal distributions 502 and 504 associated with two different attributes, and a graphical representation of a copula 506 modeling the dependence between the attributes. As an example, the first marginal distribution 502 may correspond to a Bayesian marginal density estimate determined for a first attribute (e.g., distance from intersection in scenario 104), and the second marginal distribution 504 may correspond to a Bayesian marginal density estimate determined for a different second attribute (e.g., object velocity in scenario 104). In various examples, the marginal distributions 502 and 504 may include confidence intervals and/or may correspond to outputs from smoothing or other transformation operations to model the marginal distributions as closely as possible to known distribution model templates.

In some examples, the probability model generator 118 may select the copula 506 from a predetermined set of copula types and/or characteristics provided by the simulation system 102. The copula 506 may be a Gaussian copula, or other copula selected as a most closely matching copula to accurately model the dependencies between the two attributes. Additionally, although only two related attributes are represented in this example, it can be understood from the context of this disclosure that marginal density estimate may be generated for any number of attributes, and one or more copula(s) 506 may be determined to model the relationships between the combination(s) of attributes. As shown in this example, the copula 506 may be represented as a graphical model including contours. Additionally or alternatively, the copula 506 may be represented as a cumulative distribution function. In some cases, the probability model generator 118 may select the copula based on the types and characteristics of the marginal distributions 502 and 504. For instance, a first beta (x) distribution and a second gamma (γ) distribution may result in the probability model generator 118 selected a first type/characteristics of the copula 506, while different combinations of marginal distributions 502 and 504 may result in other types/characteristics of the copula 506.

In some examples, to determine the copula 506, the probability model generator 118 may map each of the individual marginal density estimations (e.g., marginal distributions 502 and 504) into a space from [0, 1], transforming the marginal density estimations into uniform distributions. The separate uniform distributions may be plotted against each other in the [0, 1] space, and a copula 506 may be fit to the intersections of the uniform distributions [0, 1] space. Thus, the copula 506 may be a joint distribution function with margins that are uniform on the closed interval of the [0, 1] space. The contour lines of the copula 506 define the boundaries of different probability regions.

Figure 6:
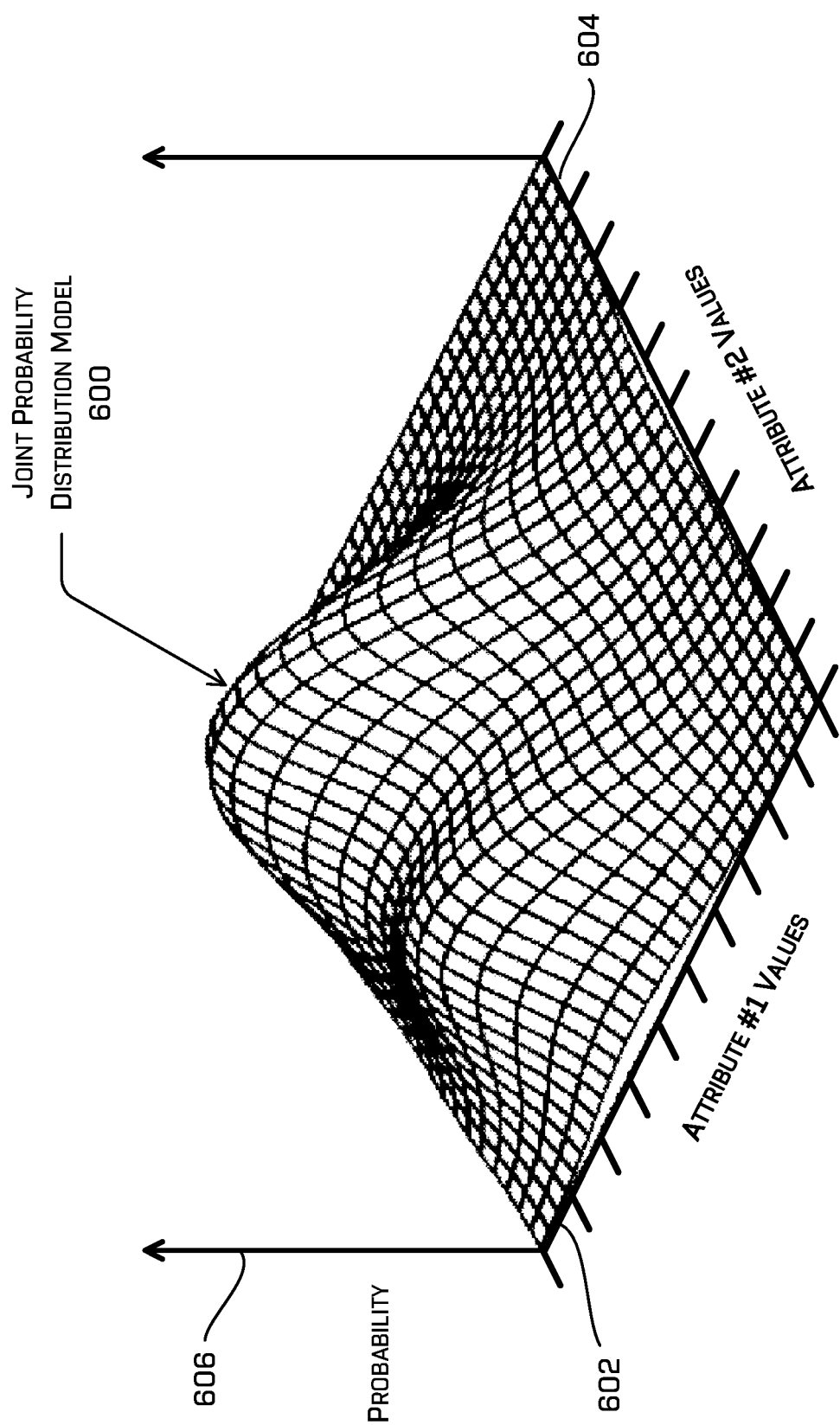
FIG. 6 depicts an example joint probability distribution model associated with separate object attributes, in accordance with one or more implementations of the disclosure.

FIG. 6 shows an example joint probability distribution model 600. In this example, the joint probability distribution model 600 defines probabilities associated with combinations of values of two different attributes. A first axis 602 corresponds to the range of values for the first attribute (e.g., object distance from the intersection), and a second axis 604 corresponds to the range of values for the second attribute (e.g., object velocity). For any pair of values of the first attribute and the second attribute, an associated probability can be determined from the joint probability distribution model 600. While the joint probability distribution model 600 is depicted as a graph in this example, it may be expressed in other forms (e.g., as a function) in other examples. The joint distribution of any vector (e.g., any combination of an attribute 1 value and an attribute 2 value) may be expressed in terms of the two marginal distributions 502 and 504, and the copula 506 describing the relationship (e.g., dependence structure) between the attributes. Additionally, as noted above, although this example includes a joint probability distribution model for only two related attributes, similar techniques may be used to generate joint distributions for any number of related attributes of a simulated object.

Additionally, although confidence intervals are not shown in this example, it can be understood from the context of this disclosure that each point within a multi-variate cumulative distribution (such as the joint probability distribution model 600), also may include confidence interval data associated with the multi-variate point. For instance, the confidence intervals for a particular point within the joint probability distribution model 600 may be determined based on the confidence intervals associated with the separate marginal distributions for the individual attributes on which the joint probability distribution model 600 is based. The simulation system 102 may determine and use the confidence intervals associated with a combinations of attribute values in the joint probability distribution model 600 (e.g., 50%, 80%, 90%, 95%, 99%, etc.) to determine confidence levels associated with the various probability determinations described herein, including probability determinations for particular driving scenarios and/or confidence levels associated with efficacy determinations of a simulation, etc.

Figure 7:
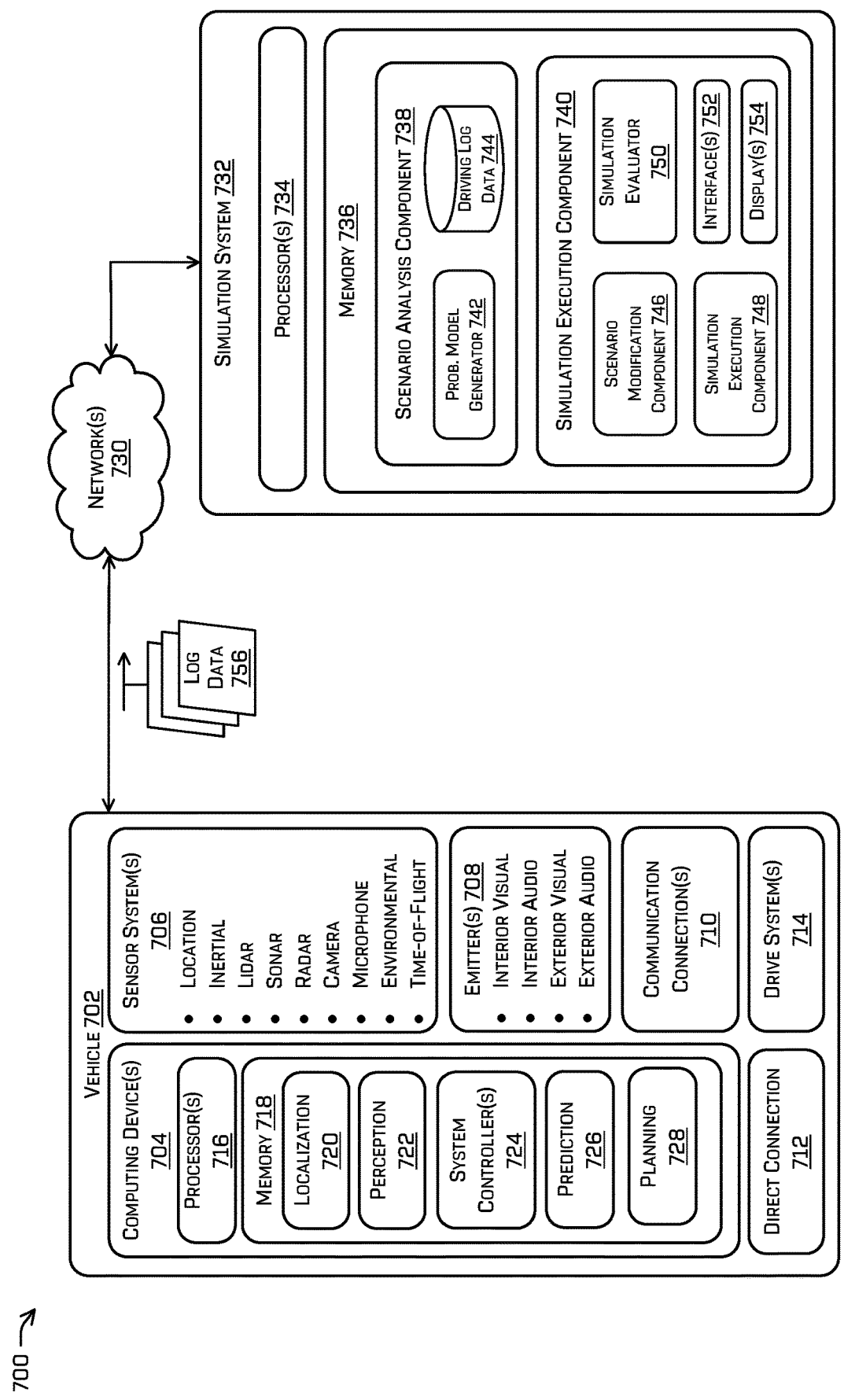
FIG. 7 is a block diagram illustrating an example system, including a vehicle and a simulation system, for implementing various techniques described herein.

FIG. 7 illustrates an example computing environment 700 that may be used to implement the driving simulation systems and techniques described herein. In this computing environment 700 includes a vehicle 702 and a simulation system 732 configured to generate, execute, and evaluate driving simulations. The vehicle 702 may include various software-based and/or hardware-based components of an autonomous vehicle, and may be used to control autonomous vehicles traversing through physical environments and/or simulated vehicles operating within log-based driving simulations. The vehicle 702 may be similar or identical to any or all of the real and/or simulated vehicles or vehicle controllers described herein. The simulation system 732 may be similar or identical to the simulation system 102 described above in reference to FIGS. 1-6. In some examples, the vehicle 702 may correspond to a vehicle traversing a physical environment, capturing and storing log data which may be provided to the simulation system 732 and used to generate a simulations. Additionally or alternatively, the vehicle 702 may operate as one or more separate vehicle control systems, interacting with and being evaluated by the simulation system 732 during a driving simulation.

In at least one example, the vehicle 702 may correspond to an autonomous or semi-autonomous vehicle configured to perform object perception and prediction functionality, route planning and/or optimization. The example vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may not include a driver and/or controls for driving the vehicle 702, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

In this example, the vehicle 702 can include vehicle computing device(s) 704, one or more sensor systems 706, one or more emitters 708, one or more communication connections 710, at least one direct connection 712, and one or more drive systems 714.

The vehicle computing device(s) 704 can include one or more processors 716 and memory 718 communicatively coupled with the one or more processors 716. In the illustrated example, the vehicle 702 is an autonomous vehicle; however, the vehicle 702 could be any other type of vehicle or robotic platform. In the illustrated example, the memory 718 of the vehicle computing device(s) 704 stores a localization component 720, a perception component 722, one or more system controllers 724, a prediction component 726, and a planning component 728. Though depicted in FIG. 7 as residing in the memory 718 for illustrative purposes, one or more of the localization component 720, the perception component 722, the system controllers 724, the prediction component 726, and the planning component 728 can additionally, or alternatively, be accessible to the vehicle 702 (e.g., stored on, or otherwise accessible by, memory remote from the vehicle 702).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for determining that an object is proximate to one or more crosswalk regions and/or for identifying candidate reference lines, as discussed herein.

In some instances, and in general, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, stoplight, stop sign, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some examples, the memory 718 can include one or more maps that can be used by the vehicle 702 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed.

In some examples, the vehicle 702 can be controlled based at least in part on the maps. That is, the maps can be used in connection with the localization component 720, the perception component 722, the prediction component 726, and/or the planning component 728 to determine a location of the vehicle 702, identify objects in an environment, and/or generate routes and/or trajectories to navigate within an environment.

In at least one example, the vehicle computing device(s) 704 can include one or more system controllers 724, which can be configured to control steering, propulsion, braking, safety, emitters, communication, and other systems of the vehicle 702. The system controller(s) 724 can communicate with and/or control corresponding systems of the drive system(s) 714 and/or other components of the vehicle 702.

In general, the prediction component 726 can include functionality to generate predicted information associated with objects in an environment. As an example, the prediction component 726 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 702 traverses an environment. In some examples, the prediction component 726 can generate one or more predicted positions, predicted velocities, predicted trajectories, etc., for such target objects based on attributes of the target object and/or other objects proximate the target object.

In general, the planning component 728 can determine a path for the vehicle 702 to follow to traverse the environment. For example, the planning component 728 can determine various routes and trajectories and various levels of detail. For example, the planning component 728 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 728 can generate an instruction for guiding the autonomous vehicle along at least a portion of the route from the first location to the second location. In at least one example, the planning component 728 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some instances, the planning component 728 can generate one or more trajectories for the vehicle 702 based at least in part on predicted location(s) associated with object(s) in an environment. In some examples, the planning component 728 can use temporal logic, such as linear temporal logic and/or signal temporal logic, to evaluate one or more trajectories of the vehicle 702.

As can be understood, the components discussed herein (e.g., the localization component 720, the perception component 722, the one or more system controllers 724, the prediction component 726, and the planning component 728 are described as divided for illustrative purposes. However, the operations performed by the various components can be combined or performed in any other component. Further, any of the components discussed as being implemented in software can be implemented in hardware, and vice versa. Further, any functionality implemented in the vehicle 702 can be implemented in one or more remoted computing device(s) (e.g., simulation system 732), or another component (and vice versa).

In at least one example, the sensor system(s) 706 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the time of flight sensors can include individual time of flight sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more networks 730, to the one or more external computing device(s) at a particular frequency, after a lapse of a predetermined period of time, in near real-time, etc.

The vehicle 702 can also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 730. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the one or more system controllers 724, the prediction component 726, and the planning component 728 can process sensor data, as described above, and can send their respective outputs, over the one or more network(s) 730, to one or more external computing device(s), such as the simulation system 732. In at least one example, the respective outputs of the components can be transmitted to the simulation system 732 at a particular frequency, after a lapse of a predetermined period of time, in near real-time, etc. Additionally or alternatively, the vehicle 702 can send sensor data to the simulation system 732 via the network(s) 730, including raw sensor data, processed sensor data and/or representations of sensor data. Such sensor data can be sent as one or more files of log data 744 to the simulation system 732 at a particular frequency, after a lapse of a predetermined period of time, in near real-time, etc.

The simulation system 732 may include one or more processors 734 and memory 736 communicatively coupled with the one or more processors 734. In the illustrated example, the memory 736 of the simulation system 532 stores a scenario analysis component 738 configured to receive and analyze driving log data from real (non-simulated) vehicles operating in physical environments, and to determine joint probability distributions associated with combinations of driving parameters of synthetic scenarios. In this example, the memory 736 of the simulation system 532 also stores a simulation execute component 740 configured to generate, execute, and evaluate driving simulations. The simulation analysis component 538 may include probability model generator 742 and a driving log data store 544. The probability model generator 742 and driving log data store 744 may be similar or identical to the probability model generator 118 and driving log data store 116 described above. The probability model generator 742 may include any or all of the functionality described herein for analyzing driving log data, determining marginal density estimates, determining cumulative distribution functions, and joint probability distributions associated with combinations of object attributes.

The simulation execution component 740 may include a scenario modification component 746 and a simulation execution component 748, which may be similar or identical to the scenario modification component 120 and a simulation execution component 122 described in the examples above. As described herein, the simulation execution component 740 may generate synthetic driving scenarios and/or modify log-based driving scenarios into synthetic scenarios, and may execute driving simulations based on the scenarios. During the execution of a driving simulation, the simulation execution component 740 may execute a set of simulation instructions and generate simulation data. In some instances, the simulation execution component 740 can execute multiple simulated scenarios simultaneously and/or in parallel. This can allow users to edit simulations and execute permutations of the simulation with variations between each simulation, including reviewing and modifying various object parameters within the driving scenario that control the attributes and behaviors of the objects in the simulations.

As noted above, driving simulations may be performed in order to test and validate the performance of autonomous vehicle controllers, such as those operating on vehicle 702. Additionally or alternatively, the simulation execution component 740 may generate and run simulation(s) responsive to receiving an instruction or a request to validate (e.g., evaluate) the simulation results and/or efficacy of a modified driving scenario. In various examples, such requests may be received based on a user input via an interface 752 and/or via a message sent via the network(s) 730 from another computing device. In some examples, the request may be received based on an instruction to periodically evaluate the efficacy of driving scenarios, based on updated driving log data within the driving log data store 744.

The simulation execution component 740 may generate the simulation(s) utilizing the techniques described above, and described in the U.S. Patent Applications incorporated by reference above. In some examples, the simulation(s) may include at least one playback vehicle (or other playback agent) and at least one simulated vehicle (and/or other simulated agent). The simulated agents/objects may be configured to be controlled based on modified sets of operational parameters, while the playback agents/objects may operate based on driving log data from a driving log data store 744 (e.g., data captured by the vehicle computing device(s) 704 during operation of the vehicle 702). In some examples the simulated objects may be included in the simulation based on proximity to the vehicle 702. The numbers of smart objects and/or playback objects included in the simulation, and the parameters applied to the smart objects may be determined based on the scenario modification component 746.

In various examples, the simulation execution component 740 may generate the simulation(s) based on input received via the interface 752 and/or from a remote computing device (e.g., via the request and/or instruction). In some examples, the input may include an identifier associated with one or more simulated objects/agents, and/or sets of operational parameters to be applied and evaluated to the simulated objects/agents. Additional input may include an identifier associated with a log to use in the evaluation, a set of scenarios to utilize for the simulation(s), a location associated with a storage of the set of scenarios, a number of scenarios to be included in the simulation, a percentage of a pre-determined set of scenarios to be included in the simulation, a time duration (e.g., time limitation) of the simulation, and/or a particular pre-determined set of scenarios and/or type thereof to be included in the simulation.

In various examples, a simulation execution component 748 may be configured to run the simulation, using simulated objects that behave and operate based on the sets of operational parameters determined by the scenario modification component 746, for controlling one or more simulated objects. Based at least in part on determining that the vehicle 702 performed consistent with one or more predetermined outcomes (that is, the autonomous controller did everything it was supposed to do) and/or determining that rules were not broken or assertions were not triggered, the simulation evaluator 750 can determine that the vehicle 702 succeeded. Based at least in part on determining that the vehicle 702 performance was inconsistent with the predetermined outcome (that is, the autonomous controller did something that it wasn't supposed to do) and/or determining that a rule was broken or than an assertion was triggered, the simulation evaluator 750 can determine that the vehicle 702 failed. Accordingly, based at least in part on executing the simulation, simulation data can indicate how the vehicle 702 responds to each simulation, as described above and determine a successful outcome or an unsuccessful outcome based at least in part on the simulation data. In some instances, the predetermined rules/assertions for a driving simulation can be based on the simulation (e.g., traffic rules regarding crosswalks can be enabled based on a crosswalk scenario or traffic rules regarding crossing a lane marker can be disabled for a stalled vehicle scenario). In some instances, the simulation execution component 740 can enable and disable rules/assertions dynamically as the simulation progresses. For example, as a simulated object approaches a school zone, rules/assertions related to school zones can be enabled and disabled as the simulated object departs from the school zone. In some instances, the rules/assertions can include comfort metrics that relate to, for example, how quickly an object can accelerate given the simulated scenario.

Additionally, the simulation evaluator 750 may determine metrics corresponding to the probability of the driving scenario upon which the simulation is based, and/or the efficacy of the simulation, based on the operational parameters determined by the scenario modification component 746. The evaluations performed by the simulation evaluator 750 may include determining probabilities associated with combinations parameters used to control simulated objects, using the various techniques described herein. The evaluations performed by the simulation evaluator 750 may include evaluations of the probability, prevalence, and/or degree of simulation realism provided by the modified driving scenario sets of operational parameters used for the simulated objects. The evaluations also may include evaluations of the efficacy of a driving scenario and/or simulation based on the on the probability, prevalence, and/or degree of realism provided. As noted above, the simulation evaluator 750 also may aggregate the evaluations of simulations, driving scenarios, and/or combinations of parameters determined by the scenario modification component 746, over multiple simulations executed based on a single simulation scenario or multiple similar simulation scenarios.

In various examples, the simulation evaluator 750 may be configured to determine whether the probabilities and/or prevalence associated with a simulation or driving scenario meets or exceeds a threshold value, such as described above. In various examples, the simulation evaluator 750 may be configured to present data associated with the evaluation, such as an indication of validation, an indication of invalidation, and/or evaluation results (e.g., performance metrics associated with the simulation(s)). In various examples, the simulation evaluator 750 may be configured to provide the data to a user, such as via the interface(s) 752 (and/or display(s) 754) and/or by causing the data to be presented via a display of a remote computing device.

In some examples, the simulation execution component 740 may include a recommendation component configured to identify when the probability associated with a driving scenario and/or simulation does not satisfy a threshold value (e.g., does not meet or exceed the threshold value), and to generate a recommendation to mitigate the error. Recommendations may include selecting a different set of operational parameters by the scenario modification component 746, after which the simulation execution component 740 may re-execute one or more simulations and re-evaluate the probability of the driving scenario. In some examples, selects sets of parameter values to control object attributes and behaviors during a driving scenario, the scenario modification component 746 may utilize machine learning techniques, heuristics, and/or other methods for identifying the sets of operational parameters having an optimal combination of prevalence/probability in real-world driving environments and likelihood of encountering a potential failure or vehicle control system issue during the simulation.

In various examples, the simulation system 732 may include one or more input/output (I/O) devices, such as via one or more interfaces 752. The interface(s) 752 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view user interfaces associated with the scenario analysis component 738 and/or the simulation execution component 740, such as to input data and/or view results via one or more displays 754. Depending on the type of computing device, such as a user computing device, server computing device, or the like, the display 754 may employ any suitable display technology. For example, the display 754 may be a liquid crystal display, a plasma display, a light emitting diode display, an OLED (organic light-emitting diode) display, an electronic paper display, or any other suitable type of display able to present digital content thereon. In some examples, the display 754 may have a touch sensor associated with the display 754 to provide a touchscreen display configured to receive touch inputs for enabling interaction with a graphical user interface presented on the display 754. Accordingly, examples herein are not limited to any particular display technology.

The processor(s) 716 of the vehicle 702 and the processor (s) 734 of the simulation system 732 can be any suitable processor capable of executing instructions to process data and perform operations as described herein. By way of example and not limitation, the processor(s) 716 and 734 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 736 are examples of non-transitory computer-readable media. The memory 718 and 736 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the simulation system 732 and/or components of the simulation system 732 can be associated with the vehicle 702. That is, the vehicle 702 can perform one or more of the functions associated with the simulation system 732, and vice versa. Further, aspects of the simulation system 732 (and subcomponents thereof) can be performed on any of the devices or systems discussed herein.

Figure 8:
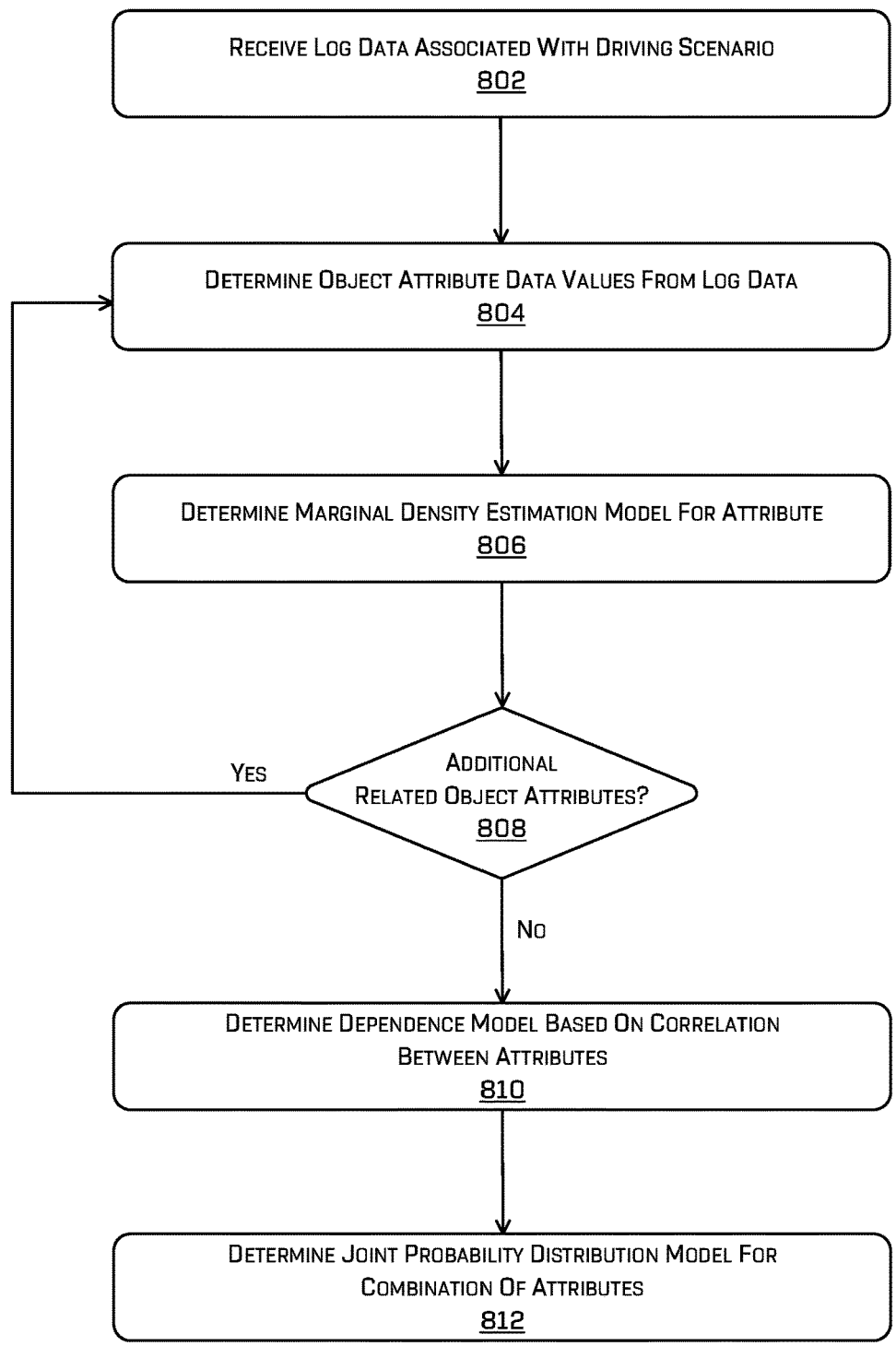
FIG. 8 is a flow diagram illustrating an example process for generating a joint probability distribution model associated with a combination of attributes, in accordance with one or more implementations of the disclosure.

FIG. 8 is a flow diagram illustrating an example process 800 for generating a joint probability distribution model associated with a combination of attributes, based on driving log data. In some examples, the operations of process 800 may be performed by similar or identical components of a simulation system (e.g., simulation system 102 and/or simulation system 732) to those discussed above, including but not limited to a probability model generator 742 (or probability model generator 118), based on driving log data (e.g., from driving log data store 744 or 116) captured by one or more vehicles 702.

At operation 802, the probability model generator 742 may receive driving log data associated with a driving scenario. As noted above, the log data may include real-world driving log data captured by the sensors of a vehicle traversing one or more physical environments. At operation 804, the probability model generator 742 may determine object data values associated with an attribute, based on the driving log data. In some cases, the probability model generator 742 may select an attribute in operation 804 and extract a set of data values from a driving log data store 744 corresponding to observed values of the selected attribute from one or more driving logs. As noted above, an attribute may include an attribute associated with an object starting state, such as an object type, object size, starting location, starting pose, starting trajectory, starting velocity, and/or starting acceleration of the object at the beginning of a portion of log data (e.g., corresponding to a simulation time window). Other attributes may include attributes associated with the behaviors or decisions made by the object, such as object navigation decisions, object movements, velocities, acceleration/deceleration rates, following distances, stopping locations relative to other objects (e.g., vehicles, signs, street markings, crosswalks, curbs, etc.).

In some cases, the log data received in operation 802, and the particular object attribute data determined in operation 804 may be restricted to data associated with one particular driving scenario and/or one particular object. In other instances, the driving log data and object attribute data may include data associated with multiple objects of the same type, multiple objects within the same driving scenario, and/or multiple objects within similar types of scenarios. As described above, the joint probability distributions generated by process 800 ultimately may be applied to determine probabilities associated with combinations of attributes for one single simulated vehicle, or for multiple similar vehicles, such as all cars of the same or similar type within a 4-way intersection scenario and/or within a scenario having similar speed limits, weather and road conditions, etc.

At operation 806, the probability model generator 742 may determine (or generate) a marginal density estimation model associated with the attribute, based on the data values for the attribute. As described above, in some examples the probability model generator 742 may use Bayesian techniques to determine a Bayesian marginal density estimation associated with the attribute. In some cases, a Poisson regression may be performed on the individual bins of attribute data values, to determine the Bayesian marginal density estimate for the attribute. Confidence intervals and/or smoothing techniques (e.g., via a kernel smoother) also may be performed in operation 806 in some examples.

At operation 808, the probability model generator 742 may determine whether one or more additional object attributes are related to attribute(s) for which marginal density estimation models have previously been generated. If at least one additional related attribute is identified (808: Yes), then process 800 may return to operation 804 to retrieve attribute data values for an additional attribute, and to generate a marginal density estimation model for the additional attribute. Otherwise, if no additional related attributes are identified (808: No), then process 800 may proceed to operation 810.

At operation 810, the probability model generator 742 may determine a dependence model (e.g., a copula or cumulative distribution function) modeling the dependence between the attributes, and at operation 812 the probability model generator 742 may determine a joint probability distribution model for the combination of attributes. The joint probability distribution model for the attributes may be determined in operation 812 based on the individual marginal density estimations determined in operation 806, and the dependence model (e.g., copula) determined in operation 812.

As described above, in some examples, the probability model generator 742 may select the dependence model from a predetermined set of copulas and/or cumulative distribution functions, based on the characteristics of the marginal density estimations and attribute dependencies. For instance, the probability model generator 742 may use a bivariate Gaussian copula, and/or may select the copula based on the types and characteristics of the marginal distributions. In some cases, the probability model generator 742 may map each of the individual marginal density estimations into a space from [0, 1], to transform the marginal density estimations into uniform distributions, and then may plot the uniform distributions against each other in the [0, 1] space. The copula then may be determined or selected fit to the intersections of the uniform distributions [0, 1] space. The joint probability distribution determined in operation 812 may define the probabilities for each possible combination of values of various attributes. For example, referring to the above example synthetic driving scenario 104, a first combination of a distance for the object vehicle 108 from the intersection and a velocity 110 may correspond to a first probability, and a second combination of the distance for the simulated object vehicle 112 from the intersection and a velocity 114 may correspond to a second probability.

Figure 9:
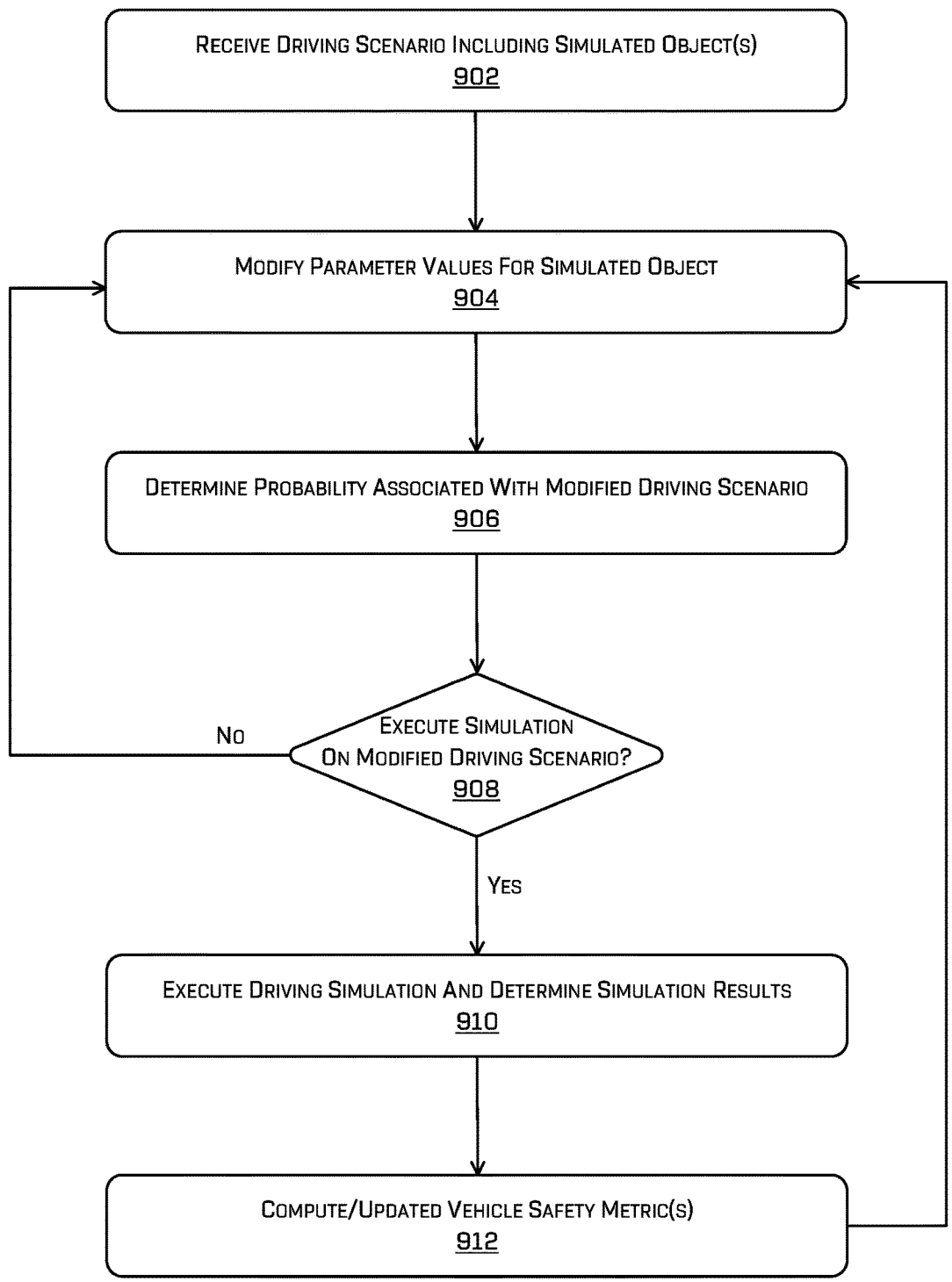
FIG. 9 is a flow diagram illustrating an example process evaluating a simulation based on a synthetic driving scenario, using a joint probability distribution model, in accordance with one or more implementations of the disclosure.

FIG. 9 is another flow diagram illustrating an example process 900 for using a joint probability distribution model associated with a combination of attributes in a driving scenario, to evaluate the probability of the driving scenario and efficacy of the simulation. In some examples, the operations of process 900 may be performed by similar or identical components of a simulation system 732 to those described above, including but not limited to a simulation execution component 740 (simulation execution component 122) including a scenario modification component 746 (or scenario modification component 120) and a simulation evaluator 750.

At operation 902, the simulation execution component 740 may receive a driving simulation scenario (e.g., a log-based or synthetic driving scenario) including a simulated environment and one or more simulated objects. At operation 904, the simulation execution component 740 may modify one or more parameter values associated with a simulate object in the driving scenario. As described above in various examples, the scenario modification component 746 may modify one or more parameters controlling the states and/or behaviors of simulated objects in a driving scenario. For instance, an example modification in operation 904 may include modifying the initial position of a simulated vehicle from the object vehicle 108 to simulated object vehicle 112, and modifying the velocity of the same simulated object vehicle from velocity 110 to velocity 114. The modification of parameters may include modifying the parameters associated with an object in a log-based driving scenario, and/or modifying the parameters of objects in synthetic scenarios generated programmatically. In either case, for partially synthetic scenarios based on modifications to log-based driving scenario, or for wholly synthetic scenarios, the driving scenario that results following the modification of parameters in operation 904 may be referred to as a synthetic driving scenario.

At operation 906, the simulation execution component 740 may use the joint probability distribution to determine a probability associated with the combination of parameter values modified in operation 904. For example, the simulation execution component 740 and/or simulation evaluator 750 may use a joint probability distribution model 600 and/or cumulative distribution function to determine the probability, by providing an input value for each attribute/parameter, and determining an output probability from the model/function.

At operation 908, the simulation execution component 740 may determine whether or not to generate and execute a driving simulation, based on the probability associated with the combination of parameter values. For example, the simulation execution component 740 may compare the probability associated with a particular combination of object parameters for a simulated object type, to a threshold probability. If the probability associated with the modified synthetic simulated object (e.g., the probability that the combination of parameters may be encountered in a real-world driving scenario) does not meet or exceed a threshold probability (908: Yes), then in this example process 900 may return to operation 904 to perform a different modification of the parameter values for the simulated object. In this way, the simulation system may save computing resources and overhead, and more efficiently evaluating the vehicle control systems by not generating and performing simulations that are unlikely to be encountered (e.g., with sufficient frequency) in real-world driving situations. In contrast, if the probability associated with the modified synthetic simulated object meets or exceeds the threshold probability (908: No), then process 900 may proceed to operation 910.

At operation 910, the simulation execution component 740 may generate and execute a driving simulation including the modified synthetic simulated object determined in operation 904, and may determine simulation results associated with the simulation, and at operation 912, the simulation execution component 740 may compute and/or update one or more vehicle safety metrics (or other vehicle performance metrics) based on the simulation results. In some examples, the vehicle safety metrics and/or other vehicle performance metrics determined for the vehicle control systems controlling a simulated vehicle (e.g., simulated vehicle 106), may be based on a combination of simulation results determined in operation 910, and the probabilities determined in operation 906. For instance, the simulation results determined in operation 910 represent performance metrics for the simulated vehicle within the synthetic driving scenario, while the probabilities determined in operation 906 represent the likelihood of encountering the same or similar driving scenarios within real-world driving conditions. In various examples, the computations of vehicle safety metrics in operation 912 may be performed repeatedly and aggregated over multiple simulations with the same driving scenario, and/or over multiple different driving scenarios, to determine vehicle safety metrics and other vehicle performance metrics for the vehicle control systems.

Although several examples above are described in reference to using copulas to represent the dependence relationships between multiple attributes, it can be understood that other techniques may be used in other implementations. For instance, in some example Gaussian mixture models may be used to generate a model based on the weighted averages of multiple distributions. Additionally or alternatively, deep learning techniques may be used in some examples to generate a deep learning model that outputs the surface of a joint distribution (e.g., joint probability distribution model 600). In the various examples described herein, any combination of these techniques may be implemented and used to determine joint distributions for estimating probabilities of synthetic scenarios and/or the efficacy associated with driving simulations.

Example Clauses

A. A system comprising: one or more processors; and one or more computer readable media storing computer executable instructions that, when executed, cause the one or more processors to perform operations comprising: receiving driving log data based at least in part on sensor data captured by a sensor in an environment, wherein the driving log data includes object data associated with a set of objects within the environment; determining a first density estimation model associated with a first attribute of the set of objects; determining a second density estimation model associated with a second attribute of the set of objects; determining a dependence model based at least in part on a correlation between the first attribute and the second attribute; determining a joint distribution model based at least in part on the first density estimation model, the second density estimation model, and the dependence model; determining a driving scenario including a first simulated object within a simulated environment; determining a first parameter value associated with the first attribute, and a second parameter value associated with the second attribute; executing a driving simulation associated with the driving scenario, wherein executing the driving simulation includes configuring the first simulated object to operate based at least in part on the first parameter value and the second parameter value; and determining a probability associated with the driving simulation, based at least in part on the joint distribution model, the first parameter value, and the second parameter value.

B. The system of paragraph A, the operations further comprising: determining a score associated with the driving simulation, based at least in part on a response from an autonomous vehicle controller to the driving scenario; and determining a vehicle safety metric associated with the autonomous vehicle controller, based at least in part on the score and the probability associated with the driving simulation.

C. The system of paragraph A, wherein: determining the first density estimation model is based on a plurality of sampled values associated with the first attribute; the first parameter value is a value separate from the plurality of sampled values; and the first density estimation model is a Bayesian function that defines a first probability estimate associated with the first parameter value, wherein the first probability estimate is a non-zero probability estimate.

D. The system of paragraph C, the operations further comprising: determining a first confidence interval associated with the first probability estimate, based at least in part on the first density estimation model.

E. The system of paragraph C, the operations further comprising: determining a kernel width based at least in part on the first density estimation model; and transforming the first density estimation model using a kernel smoother configured based at least in part on the kernel width.

F. A method comprising: receiving object data associated with an object detected in an environment; determining, based at least in part on the object data, first attribute data associated with a first attribute of the object, and second attribute data associated with a second attribute of the object; determining a joint distribution model representing the first attribute and the second attribute, based at least in part on the first attribute data and the second attribute data; determining a scenario including a simulated object within a simulated environment, wherein the simulated object is configured to operate based at least in part on a first parameter value associated with the first attribute and a second parameter value associated with the second attribute; and determining a probability associated with the scenario, based at least in part on the joint distribution model, the first parameter value, and the second parameter value.

G. The method of paragraph F, wherein: the first attribute data is associated with a first range of values of the first attribute; the first parameter value is outside of the first range of values; and determining the probability includes using the joint distribution model to determine a non-zero probability associated with the first parameter value.

H. The method of paragraph F, wherein: the first attribute data includes a gap within a first range of values of the first attribute; the first parameter value is within the gap; and determining the probability includes using the joint distribution model to determine a non-zero probability associated with the first parameter value.

I. The method of paragraph F, wherein determining the joint distribution model comprises: determining a first model based on a first distribution of the first attribute data; determining a second model based on a second distribution of the second attribute data; and determining a third model based at least in part on a correlation between the first attribute and the second attribute.

J. The method of paragraph F, further comprising: generating a first Bayesian density estimation function, based at least in part on the first attribute data; and generating a second Bayesian density estimation function, based at least in part on the second attribute data.

K. The method of paragraph J, wherein: the first attribute data includes a plurality of sampled values associated with the first attribute; the first parameter value is external to the plurality of sampled values; and the first Bayesian density estimation function defines a first probability estimate associated with the first parameter value, wherein the first probability estimate is a non-zero probability estimate.

L. The method of paragraph K, further comprising: determining a first confidence interval associated with the first probability estimate, based at least in part on the first Bayesian density estimation function.

M. The method of paragraph K, further comprising: determining a kernel width based at least in part on the first Bayesian density estimation function; and transforming the first Bayesian density estimation function using a kernel smoother configured based at least in part on the kernel width.

N. The method of paragraph F, further comprising: executing a driving simulation associated with the scenario, wherein executing the driving simulation includes receiving a response to the scenario from an autonomous vehicle controller; determining a simulation score associated with the autonomous vehicle controller, based at least in part on the response; and determining a vehicle safety metric associated with the autonomous vehicle controller, based at least in part on the simulation score and the probability associated with the scenario.

O. One or more non transitory computer readable media storing instructions executable by a processor, wherein the instructions, when executed, cause the processor to perform operations comprising: receiving object data associated with an object detected in an environment; determining, based at least in part on the object data, first attribute data associated with a first attribute of the object, and second attribute data associated with a second attribute of the object; determining a joint distribution model representing the first attribute and the second attribute, based at least in part on the first attribute data and the second attribute data; determining a scenario including a simulated object within a simulated environment, wherein the simulated object is configured to operate based at least in part on a first parameter value associated with the first attribute and a second parameter value associated with the second attribute; and determining a probability associated with the scenario, based at least in part on the joint distribution model, the first parameter value, and the second parameter value.

P. The one or more non transitory computer readable media of paragraph O, wherein determining the joint distribution model comprises: determining a first model based on a first distribution of the first attribute data; determining a second model based on a second distribution of the second attribute data; and determining a third model based at least in part on a correlation between the first attribute and the second attribute.

Q. The one or more non transitory computer readable media of paragraph O, the operations further comprising: generating a first Bayesian density estimation function, based at least in part on the first attribute data; and generating a second Bayesian density estimation function, based at least in part on the second attribute data.

R. The one or more non transitory computer readable media of paragraph Q, wherein: the first attribute data includes a plurality of sampled values associated with the first attribute; the first parameter value is external to the plurality of sampled values; and the first Bayesian density estimation function defines a first probability estimate associated with the first parameter value, wherein the first probability estimate is a non-zero probability estimate.

S. The one or more non transitory computer readable media of paragraph R, the operations further comprising: determining a first confidence interval associated with the first probability estimate, based at least in part on the first Bayesian density estimation function.

T. The one or more non transitory computer readable media of paragraph Q, the operations further comprising: determining a kernel width based at least in part on the first Bayesian density estimation function; and transforming the first Bayesian density estimation function using a kernel smoother configured based at least in part on the kernel width.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing computer-executable instructions that, when executed, cause the one or more processors to perform operations comprising:
receiving driving log data based at least in part on sensor data captured by a sensor in an environment, wherein the driving log data includes object data associated with a set of objects within the environment;
determining a first density estimation model associated with a first attribute of the set of objects;
determining a second density estimation model associated with a second attribute of the set of objects;
determining a dependence model based at least in part on a correlation between the first attribute and the second attribute;
determining a joint distribution model based at least in part on the first density estimation model, the second density estimation model, and the dependence model;
determining a driving scenario including a first simulated object within a simulated environment;
determining a first parameter value associated with the first attribute, and a second parameter value associated with the second attribute;
executing a driving simulation associated with the driving scenario, wherein executing the driving simulation includes configuring the first simulated object to operate based at least in part on the first parameter value and the second parameter value; and
determining a probability associated with the driving simulation, based at least in part on the joint distribution model, the first parameter value, and the second parameter value.

2. The system of claim 1, the operations further comprising:
determining a score associated with the driving simulation, based at least in part on a response from an autonomous vehicle controller to the driving scenario; and
determining a vehicle safety metric associated with the autonomous vehicle controller, based at least in part on the score and the probability associated with the driving simulation.

3. The system of claim 1, wherein:
determining the first density estimation model is based on a plurality of sampled values associated with the first attribute;

the first parameter value is a value separate from the plurality of sampled values; and the first density estimation model is a Bayesian function that defines a first probability estimate associated with the first parameter value, wherein the first probability estimate is a non-zero probability estimate.

4. The system of claim 3, the operations further comprising:
determining a first confidence interval associated with the first probability estimate, based at least in part on the first density estimation model.

5. The system of claim 3, the operations further comprising:
determining a kernel width based at least in part on the first density estimation model; and
transforming the first density estimation model using a kernel smoother configured based at least in part on the kernel width.

6. A method comprising:
receiving object data associated with an object detected in an environment;
determining, based at least in part on the object data:
a first density distribution based at least in part on first attribute data associated with the object; and
a second density distribution based at least in part on second attribute data associated with the object;
determining a joint distribution model representing the first attribute data and the second attribute data, based at least in part on the first density distribution and the second density distribution;
executing a driving simulation comprising controlling a simulated object within a simulated environment, wherein the simulated object is configured to operate based at least in part on a first parameter value associated with the first attribute data and a second parameter value associated with the second attribute data; and
determining a probability associated with the driving simulation, based at least in part on the joint distribution model, the first parameter value, and the second parameter value.

7. The method of claim 6, wherein:
the first attribute data is associated with a first range of values of a first attribute;
the first parameter value is outside of the first range of values; and
determining the probability includes using the joint distribution model to determine a non-zero probability associated with the first parameter value.

8. The method of claim 6, wherein:
the first attribute data includes a gap within a first range of values of a first attribute;
the first parameter value is within the gap; and
determining the probability includes using the joint distribution model to determine a non-zero probability associated with the first parameter value.

9. The method of claim 6, wherein determining the joint distribution model comprises:
determining a first model based on the first density distribution;
determining a second model based on the second density distribution; and
determining a third model based at least in part on a correlation between the first attribute data and the second attribute data.

10. The method of claim 6, further comprising:
generating a first Bayesian density estimation function, based at least in part on the first attribute data; and
generating a second Bayesian density estimation function, based at least in part on the second attribute data.

11. The method of claim 10, wherein:
the first attribute data includes a plurality of sampled values associated with a first attribute;
the first parameter value is external to the plurality of sampled values; and
the first Bayesian density estimation function defines a first probability estimate associated with the first parameter value, wherein the first probability estimate is a non-zero probability estimate.

12. The method of claim 11, further comprising:
determining a first confidence interval associated with the first probability estimate, based at least in part on the first Bayesian density estimation function.

13. The method of claim 11, further comprising:
determining a kernel width based at least in part on the first Bayesian density estimation function; and
transforming the first Bayesian density estimation function using a kernel smoother configured based at least in part on the kernel width.

14. The method of claim 6,
wherein executing the driving simulation comprises; includes
receiving a response from an autonomous vehicle controller;
determining a simulation score associated with the autonomous vehicle controller, based at least in part on the response; and
determining a vehicle safety metric associated with the autonomous vehicle controller, based at least in part on the simulation score and the probability associated with the driving simulation.

15. One or more non-transitory computer-readable media storing instructions executable by a processor, wherein the instructions, when executed, cause the processor to perform operations comprising:
receiving object data associated with an object detected in an environment;
determining, based at least in part on the object data;
a first density distribution based at least in part on first attribute data associated with the object; and
a second density distribution based at least in part on second attribute data associated with the object;
determining a joint distribution model representing the first attribute data and the second attribute data, based at least in part on the first density distribution and the second density distribution;
executing a driving simulation comprising controlling a simulated object within a simulated environment, wherein the simulated object is configured to operate based at least in part on a first parameter value associated with the first attribute data and a second parameter value associated with the second attribute data; and
determining a probability associated with the driving simulation, based at least in part on the joint distribution model, the first parameter value, and the second parameter value.

16. The one or more non-transitory computer-readable media of claim 15, wherein determining the joint distribution model comprises:
determining a first model based on the first density distribution;
determining a second model based on the second density distribution; and determining a third model based at least in part on a correlation between the first attribute data and the second attribute data.

17. The one or more non-transitory computer-readable media of claim 15, the operations further comprising:
generating a first Bayesian density estimation function, based at least in part on the first attribute data; and
generating a second Bayesian density estimation function, based at least in part on the second attribute data.

18. The one or more non-transitory computer-readable media of claim 17, wherein:
the first attribute data includes a plurality of sampled values associated with a first attribute;
the first parameter value is external to the plurality of sampled values; and
the first Bayesian density estimation function defines a first probability estimate associated with the first parameter value, wherein the first probability estimate is a non-zero probability estimate.

19. The one or more non-transitory computer-readable media of claim 18, the operations further comprising:
determining a first confidence interval associated with the first probability estimate, based at least in part on the first Bayesian density estimation function.

20. The one or more non-transitory computer-readable media of claim 17, the operations further comprising:
determining a kernel width based at least in part on the first Bayesian density estimation function; and
transforming the first Bayesian density estimation function using a kernel smoother configured based at least in part on the kernel width.

\* \* \* \* \*